(12) United States Patent
Lin et al.

(10) Patent No.: US 8,471,960 B2
(45) Date of Patent: Jun. 25, 2013

(54) METHOD CAPABLE OF AVOIDING DATA ERROR FROM INCORRECT SAMPLING POINTS

(75) Inventors: Siou-Shen Lin, Taipei County (TW); Hung Hui Ho, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 891 days.

(21) Appl. No.: 12/276,785

(22) Filed: Nov. 24, 2008

(65) Prior Publication Data
US 2010/0128175 A1 May 27, 2010

(51) Int. Cl.
 H04N 11/20 (2006.01)
 H04N 7/00 (2011.01)
(52) U.S. Cl.
 USPC .......................... 348/465; 348/468; 348/466
(58) Field of Classification Search
 USPC .................................................. 348/465–468
 See application file for complete search history.

(56) References Cited

U.S. PATENT DOCUMENTS

| | | | |
|---|---|---|---|
| 4,614,971 A | 9/1986 | Maney et al. | |
| 4,630,271 A | 12/1986 | Yamada | |
| 4,667,235 A * | 5/1987 | Nozoe et al. | 348/464 |
| 5,483,289 A | 1/1996 | Urade et al. | |
| 5,923,711 A | 7/1999 | Willming | |
| 6,046,784 A | 4/2000 | Lee | |
| 6,169,716 B1 * | 1/2001 | Buchler | 369/59.17 |
| 6,239,843 B1 | 5/2001 | Gaudreau | |
| 6,381,287 B1 | 4/2002 | Shin | |
| 6,556,247 B1 | 4/2003 | Ranta et al. | |
| 6,839,091 B1 | 1/2005 | Hebbalalu et al. | |
| 6,977,975 B1 * | 12/2005 | Reuveni | 375/340 |
| 7,092,466 B2 | 8/2006 | Hwang et al. | |
| 7,098,960 B2 | 8/2006 | Suzuki et al. | |
| 7,184,494 B2 * | 2/2007 | Umetani | 375/324 |
| 7,317,489 B2 | 1/2008 | Thaly et al. | |
| 2004/0041944 A1 | 3/2004 | Matsumoto | |
| 2005/0031065 A1 * | 2/2005 | Gupta et al. | 375/371 |
| 2005/0155085 A1 * | 7/2005 | Thaly et al. | 725/136 |
| 2005/0185742 A1 * | 8/2005 | Liu | 375/348 |
| 2005/0195326 A1 * | 9/2005 | Kudou | 348/465 |
| 2005/0275436 A1 * | 12/2005 | Shih et al. | 327/94 |
| 2006/0114069 A1 * | 6/2006 | Kojima et al. | 331/16 |
| 2006/0268170 A1 * | 11/2006 | Suzuki et al. | 348/465 |
| 2007/0018733 A1 * | 1/2007 | Wang et al. | 331/16 |
| 2007/0047680 A1 | 3/2007 | Okamura | |
| 2007/0083801 A1 * | 4/2007 | Kanbayashi | 714/724 |
| 2007/0252902 A1 * | 11/2007 | Lin et al. | 348/231.4 |

FOREIGN PATENT DOCUMENTS

TW 200808050 2/2008

OTHER PUBLICATIONS

English language translation of abstract of CN 1798017 (published Jul. 5, 2006).
English language translation of abstract of CN 101115179 (published Jan. 30, 2008).
English language translation of abstract of TW 200808050 (published Feb. 1, 2008).

* cited by examiner

*Primary Examiner* — Michael Lee
(74) *Attorney, Agent, or Firm* — McClure, Qualey & Rodack, LLP

(57) ABSTRACT

Data decoding devices avoiding data error from incorrect sampling points caused by serious interference are disclosed. The data decoding devices receive an analog signal carrying a reference clock and at least one digital data. In the data decoding device, a slicer slices the analog signal at different sampling points by first and second sampling clocks to obtain first and second bitstreams, and the first and second sampling clocks have the same frequency and a predetermined phase difference. A data check unit evaluates whether the first bitstream is erroneous according to an error checking code thereof, outputs the first bitstream if it is error-free, and evaluates whether the second bitstream is erroneous according to the error checking code if the first bitstream is erroneous.

10 Claims, 11 Drawing Sheets

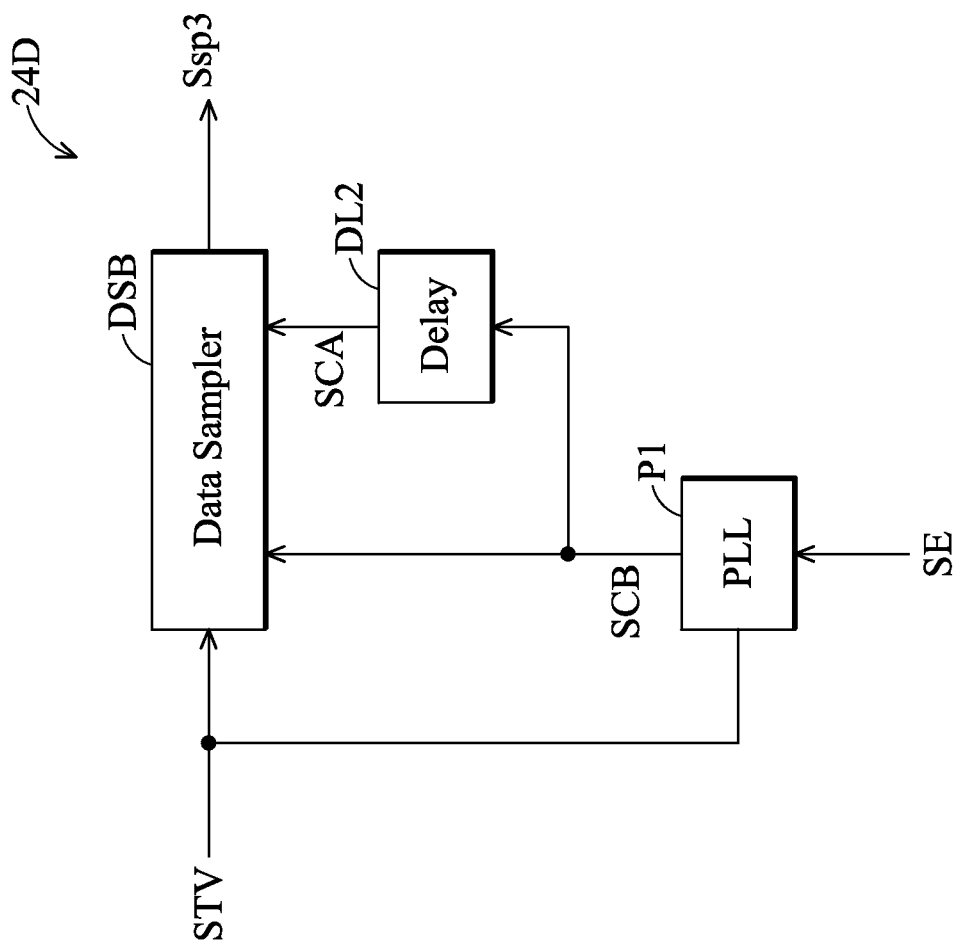

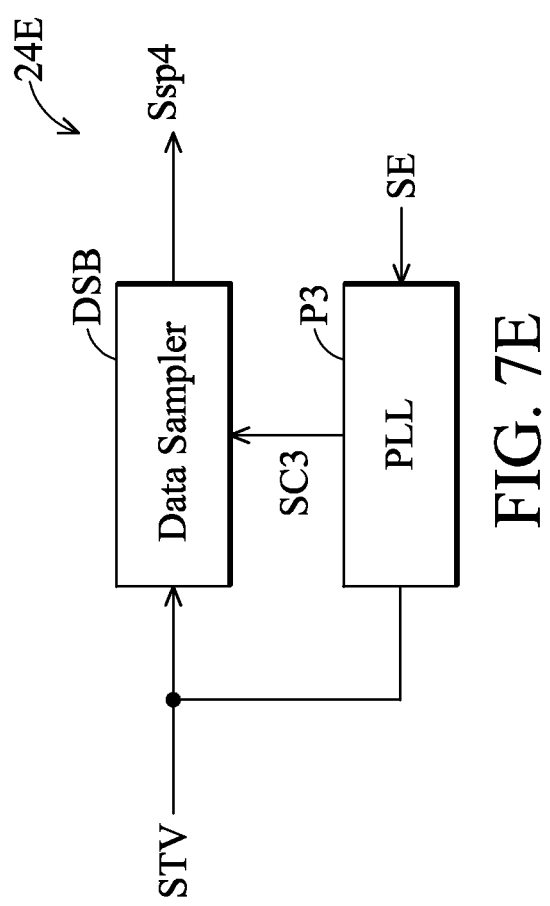

US 8,471,960 B2

METHOD CAPABLE OF AVOIDING DATA ERROR FROM INCORRECT SAMPLING POINTS

BACKGROUND OF THE INVENTION

1. Field of the Invention

The invention relates to a teletext, and in particular to a data decoding device capable of avoiding data error from incorrect sampling points caused by serious interference.

2. Description of the Related Art

Teletext is a popular service for European television broadcast, commonly providing information including TV schedules, current affairs and sports news, games and subtitling in different languages. Teletext comprises encoded data carried in the vertical blanking interval (VBI) of a television broadcast signal that temporarily suspends transmission of the signal, allowing scanning to return to the first line of the television screen to trace the next. Upon reception, a data slicer in a receiver compares the TV broadcast signal transmitted at the VBI with a slicing level to determine each bit representing the teletext data.

FIG. 1 illustrates a waveform and corresponding slicing result of a TV broadcast signal. The VBI can be divided into clock-run-in, start code (not shown in FIG. 1), and teletext data. The slicing level is typically determined by the signal amplitude during the clock-run-in interval, and is set to assess each bit carried by teletext to be either 0 or 1. The slicing level, for example, can be the average amplitude of the TV broadcast signal received during clock-run-in interval. However, the TV broadcast signal experiences interference including environmental noise and group delay during data transmission, such that signal quality of the TV signal degrades, leading to false data determination.

BRIEF SUMMARY OF THE INVENTION

Embodiments of a data decoding device receiving an analog signal carrying a reference clock and at least one digital data are provided, in which a slicer slices the analog signal at different sampling points by first and second sampling clocks to obtain first and second bitstreams, and the first and second sampling clocks have the same frequency and a predetermined phase difference. A data check unit evaluates whether the first bitstream is erroneous according to an error checking code thereof, outputs the first bitstream if it is error-free, and evaluates whether the second bitstream is erroneous according to the error checking code if the first bitstream is erroneous.

The invention provides another embodiment of data decoding device receiving an analog signal carrying a reference clock and at least one digital data, in which a slicer generates a sampling clock with a frequency which is N times that of the reference clock, to slice the analog signal according to the sampling clock thereby obtaining a first bitstream. A data check unit divides the first bitstream into at least second and second bitstreams, evaluates whether the second bitstream is erroneous according to an error checking code thereof, outputs the second bitstream if it is error-free, and evaluates whether the third bitstream is erroneous according to the error checking code if the second bitstream is erroneous.

The invention provides an embodiment of a method for decoding an analog signal carrying a reference clock and at least one digital data, in which the analog signal is sliced at different sampling points by first and second sampling clocks to obtain first and second bitstreams, wherein the first and second sampling clocks have the same frequency and a predetermined phase difference. Whether the first bitstream is erroneous is evaluated according to an error checking code thereof, and the first bitstream is output if it is error-free. Whether the second bitstream is erroneous is evaluated according to the error checking code if the first bitstream is erroneous.

The invention provides another embodiment of a method for decoding an analog signal carrying a reference clock and at least one digital data, in which a sampling clock with a frequency N times that of the reference clock, is generated, wherein N is an integer $\geq 2$. The analog signal is sliced to obtain a first bitstream according to the sampling clock, and the first bitstream is divided into at least second and third bitstreams. Whether the second bitstream is erroneous is evaluated according to an error checking code thereof, the second bitstream is output if it is error-free. Whether the third bitstream is erroneous is evaluated according to the error checking code if the second bitstream is erroneous.

BRIEF DESCRIPTION OF THE DRAWINGS

The invention can be more fully understood by reading the subsequent detailed description and examples with references made to the accompanying drawings, wherein:

FIG. 7D shows another embodiment of a slicer; and

FIG. 7E shows another embodiment of a slicer.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
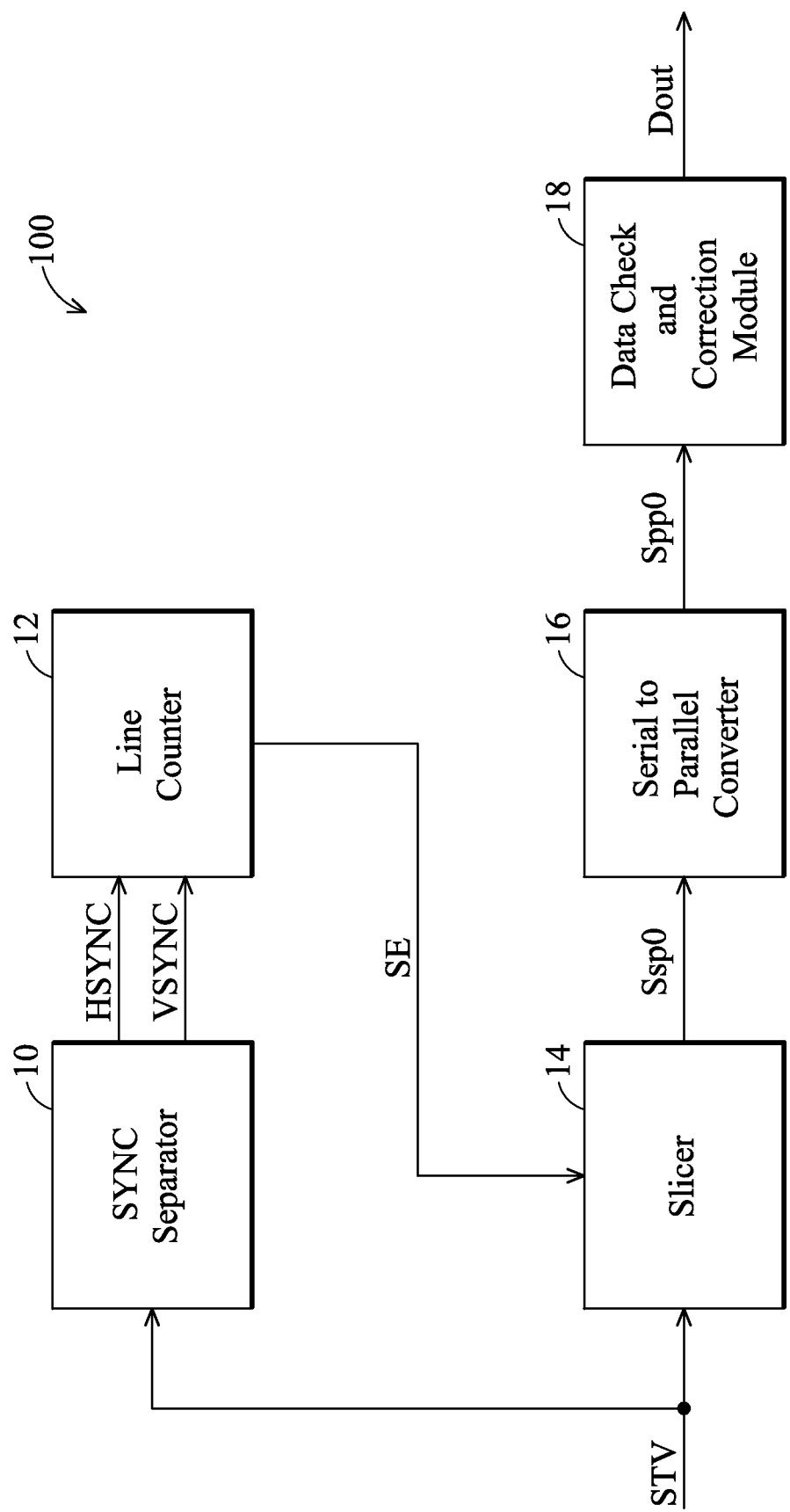
FIG. 2 shows an embodiment of a data decoding device.

FIG. 2 shows an embodiment of a data decoding device. As shown, a data decoding device 100 comprises a synchronization (SYNC) separator 10, a line counter 12, a slicer 14, a serial to parallel converter 16 and a data check and correction module 18. The SYNC separator 10 receives a television (broadcast) signal STV to generate a horizontal synchronization signal HSYNC and a vertical synchronization signal VSYNC to the line counter 12. The line counter 12 calculates a number of scan lines of the television signal STV according to the synchronization signals HSYNC and VSYNC to determine the location of vertical blanking interval (VBI). When the number of scan lines reaches a predetermined range carrying the teletext data, the line counter 12 generates a line enable signal SE to slicer 14.

Figure 1:
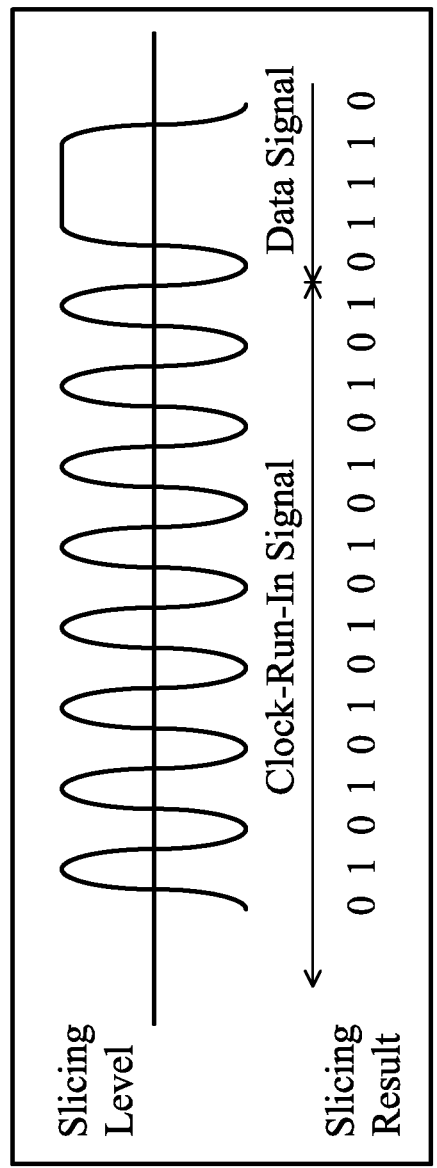
FIG. 1 illustrates a waveform and corresponding slicing result of a TV broadcast signal.

In North American Television Broadcast System, the teletext data and close captions are located at lines 21 and 284, therefore the line counter 12 generates the line enable signal SE to the slicer 14 during the scan line ranges, to enable the slicer 14 to slice the television signal STV according to a threshold level STH and generate sliced data Sps0. The serial to parallel converter 16 receives and converts the serially received data Sps0 into data Spp0 transmitted simultaneously to the data check and correction module 18. The data check and correction module 18 employs a predetermined error checking algorithm for the data Spp0 to generate output data Dout. In the embodiment, the television signal STV carries a reference clock (i.e. the clock-run-in signal shown in FIG. 1) during the clock-run-in interval and a least one digital data (i.e. teletext or close captions).

Figure 3:
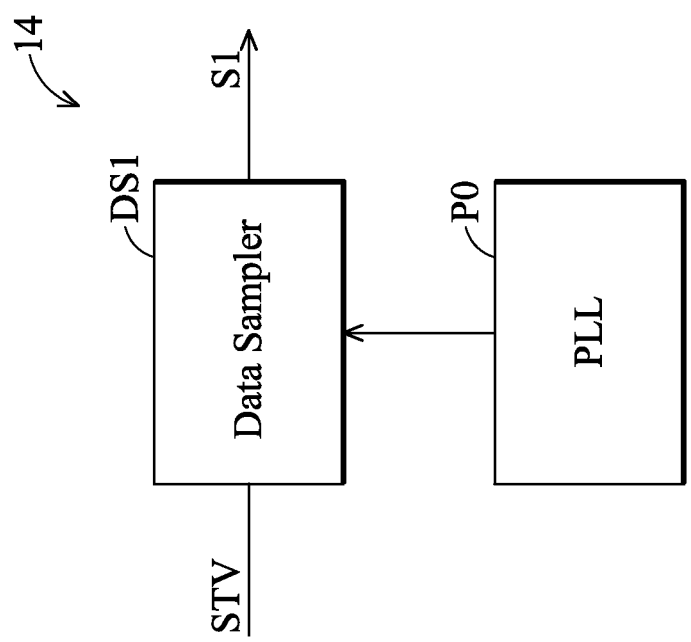
FIG. 3 shows an embodiment of a slicer.
Figure 4:
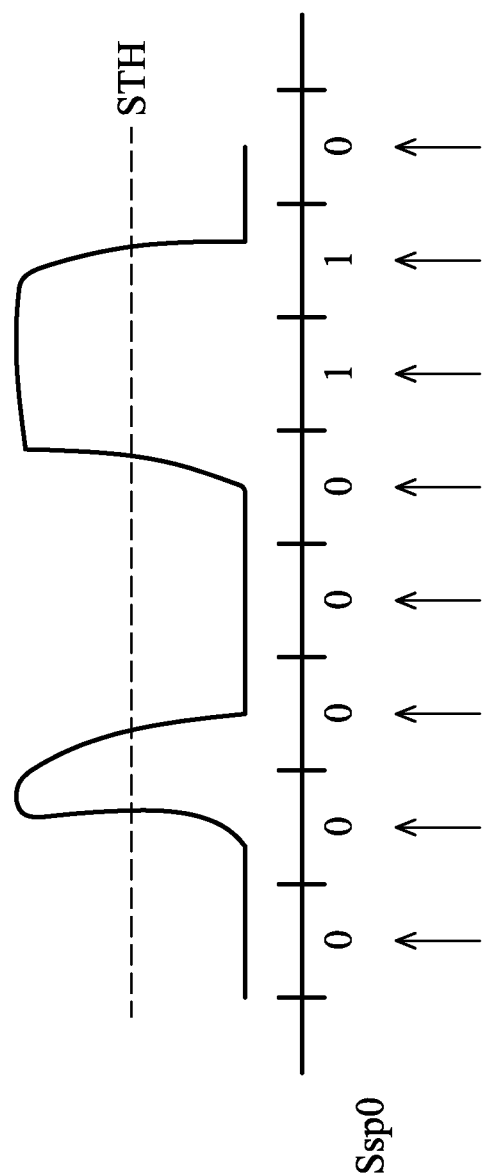
FIG. 4 shows a waveform diagram of television signal STV and threshold level STH in a noisy transmission environment.

FIG. 3 shows an embodiment of a slicer comprising a data sampler DS1 and a phase lock loop circuit P0. The slicer 14 employs the phase lock loop circuit P0 to phase-lock the television signal STV during the clock-run-in interval to determine sampling points for the data sampler DS1. For example, the phase lock loop circuit P0 outputs a sampling clock SC1 with a frequency identical to the reference clock (i.e. the clock-run-in signal shown in FIG. 1) carried by the television signal STV during the clock-run-in interval. FIG. 4 is a waveform diagram of television signal STV and threshold level STH in a noisy transmission environment, incorporating the data encoding system in FIG. 3. The waveform comprises television signal STV, threshold level STH and sliced data Sps0. The television signal STV suffers signal degradation by interference, such that the teletext data (closed captions) carried by the television signal STV may be incorrectly decoded by the sampling points determined in the clock-run-in interval. For example, the slicer 14 may generate "logic 0" despite data at point A being "logic 1" because of incorrect sampling points caused by serious interference.

In order to reduce data error in the teletext data or close captions, the invention also provides another embodiment of a data decoding system.

Figure 5:
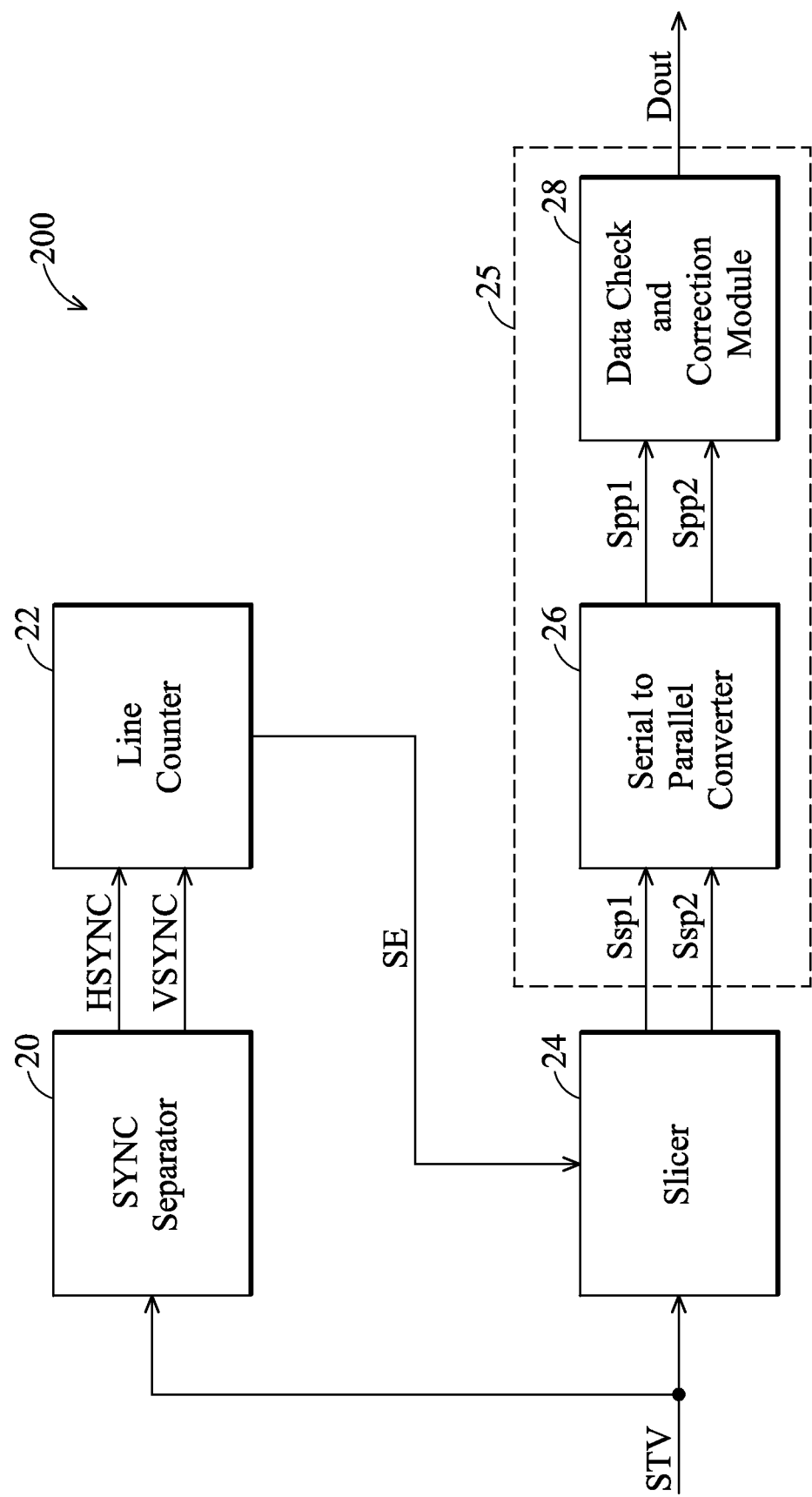
FIG. 5 shows another embodiment of the data decoding device.

FIG. 5 shows another embodiment of the data decoding device. As shown, the data decoding device 200 comprises a SYNC separator 20, a line counter 22, a slicer 24 and a data check unit 25. Operations and structures of the SYNC separator 20 and the line counter 22 are similar to those of the SYNC separator 10 and the line counter 12, and thus are omitted for simplification.

The slicer 24 employs first and second sampling clocks (not shown) with the same frequency but different phase to slice the television signal STV at different sampling points, thereby obtaining bitstreams Sps1 and Sps2. For example, the slicer 24 phase-locks the reference clock in the television signal STV during the clock-run-in interval to generate the first and second sampling clocks having the same frequency but not inphase (i.e. the first and second sampling clocks have a predetermined phase difference therebetween). Then, the slicer 24 slices the television signal STV at different sampling points to obtain the bitstreams Sps1 and Sps2 according to the generated first and second sampling clocks and a threshold level STH. For example, the threshold level STH can be fixed or adaptive.

The data check unit 25 comprises a serial to parallel converter 26 receiving and converting the serially received bitstreams Sps1 and Sps2 into bitstreams Spp1 and Spp2 respectively and a data check and correction module 28 evaluates whether the bitstreams Spp1 and Spp2 are erroneous and outputs one according to the evaluated result to serve as the output data Dout. In this embodiment, the data check and correction module 28 evaluates whether the bitstreams Spp1 and Spp2 are erroneous by odd parity check and outputs one of the bitstreams Spp1 and Spp2 selectively.

For example, the data check and correction module 28 may evaluate whether the bitstream Spp1 is erroneous, and outputs the bitstream Spp1 to serve as the output data Dout if it is error-free. Conversely, the data check and correction module 28 evaluates whether the bitstream Spp2 is erroneous according to the error checking code if the bitstream Spp1 is erroneous and outputs the bitstream Spp2 to serve as the output data Dout if it is error-free. As bitstream Spp2 is also erroneous, the data check and correction module 28 output the bitstream Spp1 to serve as the output data Dout.

Figure 6:
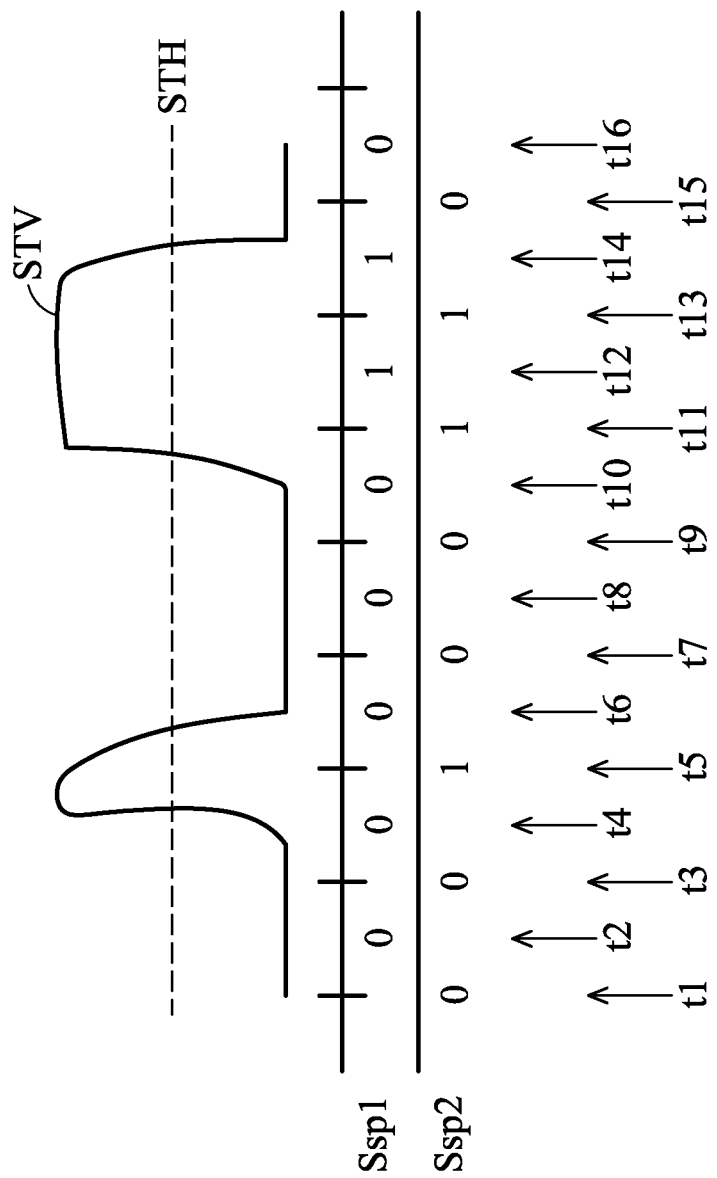
FIG. 6 is a waveform diagram of television signal STV and threshold level STH in a noisy transmission environment, incorporating the data encoding device in FIG. 5.

FIG. 6 shows a waveform diagram of television signal STV and threshold level STH in a noisy transmission environment, incorporating the data encoding system in FIG. 5. As shown, the slicer 24 employs the first sampling clock (not shown) to slice the television signal STV at sampling points (or time points) t2, t4, t6, . . . , t16 to obtain the bitstream Sps1 and employs the second sampling clock (not shown) to slice the television signal STV at another sampling points t1, t3, t5, . . . , t15 to obtain the bitstream Sps2. Because bitstream Sps1 "0000 0110" sliced at sampling points t2, t4, t6, . . . , t16 is erroneous according to odd parity check, the data check and correction module 28 evaluates whether the bitstreams Sps2 "0010 0110" sliced at another sampling points, i.e. t1, t3, t5, . . . , t15, is erroneous. The data check and correction module 28 then outputs the bitstream Sps2 "0010 0110" to serve as the output data Dout because the bitstream Sps2 "0010 0110" is correct according to odd parity check. In some examples, the bitstreams Sps1 and Sps2 can be evaluated by even parity check or Hamming code check but are not limited thereto.

In some embodiments, the data check unit 25 (i.e., the serial to parallel converter 26 and the data check and correction module 28) can also be implemented by a general purpose processor. Namely, the steps of receiving and converting the serially received bitstreams Sps1 and Sps2 into bitstreams Spp1 and Spp2 respectively, evaluating whether the bitstreams Spp1 and Spp2 are erroneous and outputting one according to the evaluated result to serve as the output data Dout can be executed by software, such as a program.

Alternately, the slicer 24 may phase-lock the reference clock in the television signal STV during the clock-run-in interval to generate a sampling clock with a frequency N times that of the reference clock. The slicer 24 then slices the television signal STV to obtain a bitstream according to the generated sampling clock and the threshold level STH. The serial to parallel converter 26 receives and converts the serially received bitstreams from the slicer 24 into N bitstreams and the data check and correction module 28 evaluates whether the N bitstreams are erroneous and outputs one according to the evaluated result to serve as the output data Dout, wherein N is an integer $\geq 2$.

For example, the slicer 24 can phase-lock the reference clock in the television signal STV during the clock-run-in interval to generate a sampling clock with a frequency which 2 times that of the reference clock. The slicer 24 then slices the television signal STV to obtain a bitstream according to the generated sampling clock and the threshold level STH. The serial to parallel converter 26 receives and converts the serially received bitstreams from the slicer 24 into the bitstreams Spp1 and Spp2. For instance, the serial to parallel converter 26 receives the bitstream from slicer 24, divides the bitstream into two bitstreams, odd-numbered ($1^{st}$, $3^{rd}$, $5^{th}$, . . . ) and even-numbered ($2^{nd}$, $4^{th}$, $6^{th}$, . . . ), and converts the two bitstreams into the bitstreams Spp1 and Spp2. The data check and correction module 28 evaluates whether the bitstreams Spp1 and Spp2 are erroneous and outputs one according to the evaluated result to serve as the output data Dout.

Figure 7A:
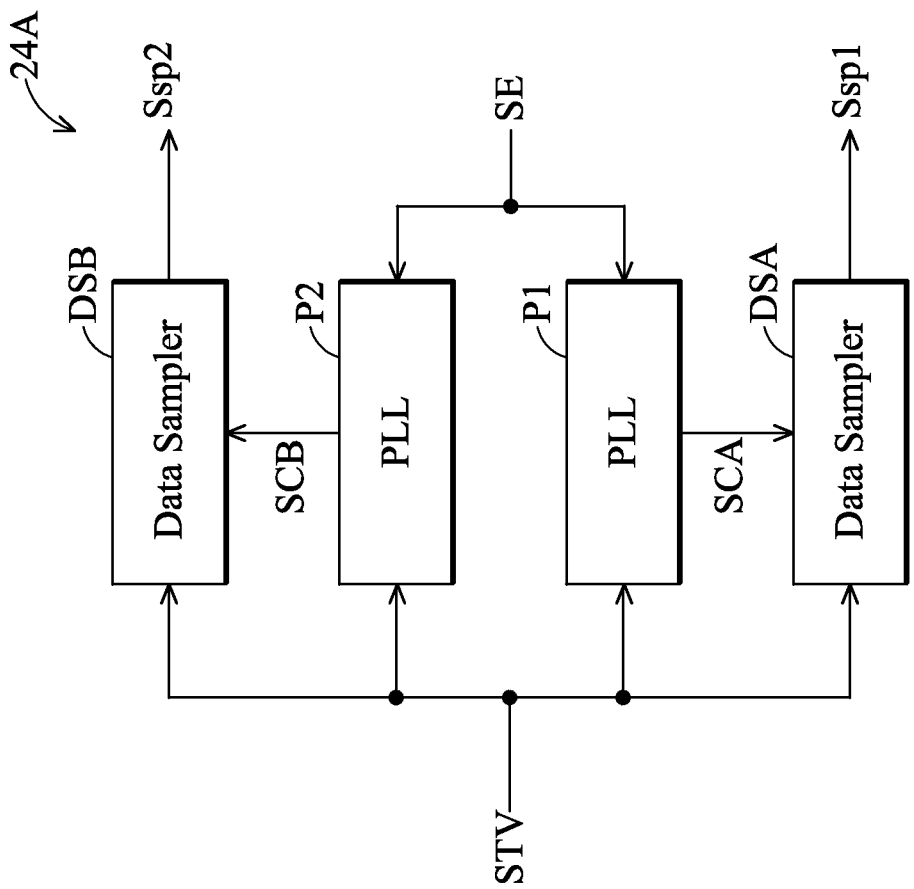
FIG. 7A shows an embodiment of a slicer.

FIG. 7A shows an embodiment of a slicer. As shown, a slicer 24A comprises two data samplers DSA and DSB and two phase lock loop circuits P1 and P2. When receiving the enable signal SE from the line counter 22, the slicer 14 employs the phase lock loop circuits P1 and P2 to phase-lock the television signal STV during the clock-run-in interval to determine sampling points for the data sampler DSA and DSB respectively. For example, the phase lock loop circuit P1 outputs a sampling clock SCA with a frequency identical to the reference clock carried by the television signal STV during the clock-run-in interval. Similarly, the phase lock loop circuit P2 outputs a sampling clock SCB with a frequency identical to the reference clock carried by the television signal STV during the clock-run-in interval. It should be noted that the sampling clocks SCA and SCB have the same frequency and a predetermined phase difference therebetween. The data sampling circuit DSA slices the television signal STV to obtain the bitstreams Sps1 according to the generated sampling clock SCA and the threshold level STH, and the data sampler DSB slices the television signal STV to obtain the bitstreams Sps2 according to the generated sampling clock SCB and the threshold level STH. Namely, the slicer 24A can slice the television signal STV to obtain bitstreams Sps1 and Sps2 at different sampling points.

Figure 7B:
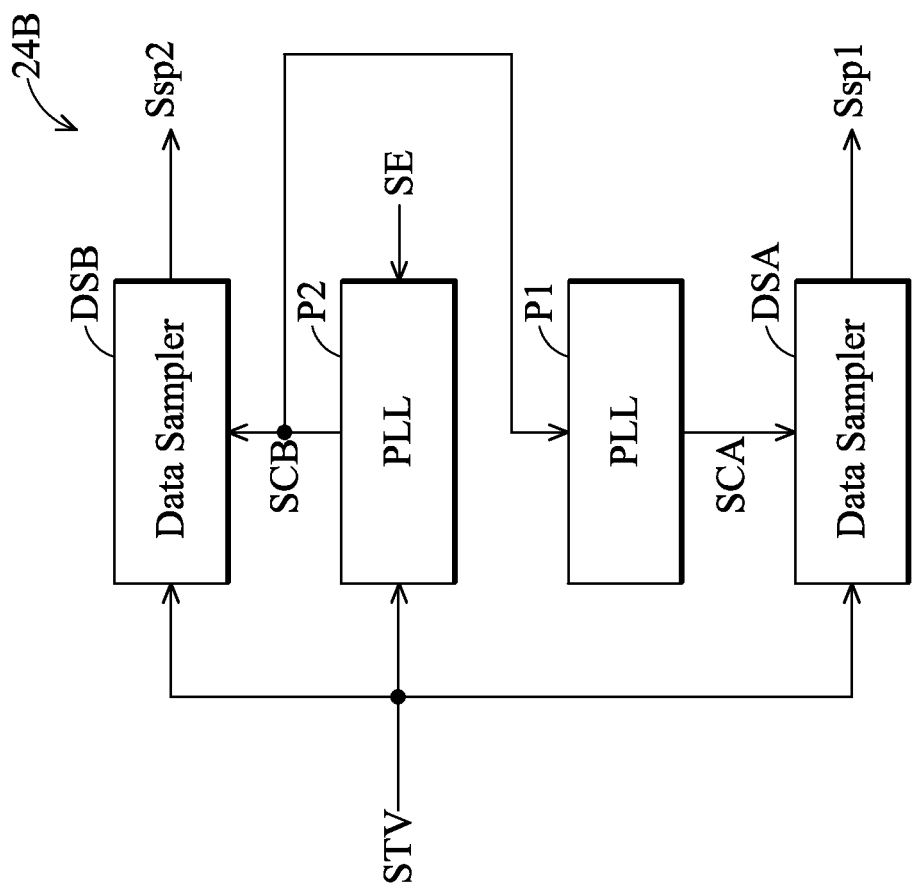
FIG. 7B shows another embodiment of a slicer.

FIG. 7B shows another embodiment of a slicer. As shown, a slicer 24B is similar to the slicer 24A shown in FIG. 7A, differing only in that the phase lock loop circuit P1 is omitted and the sampling clock SCA is generated by a delay circuit DL1 according to the sampling clock SCB from the phase lock loop circuit P2.

Figure 7C:
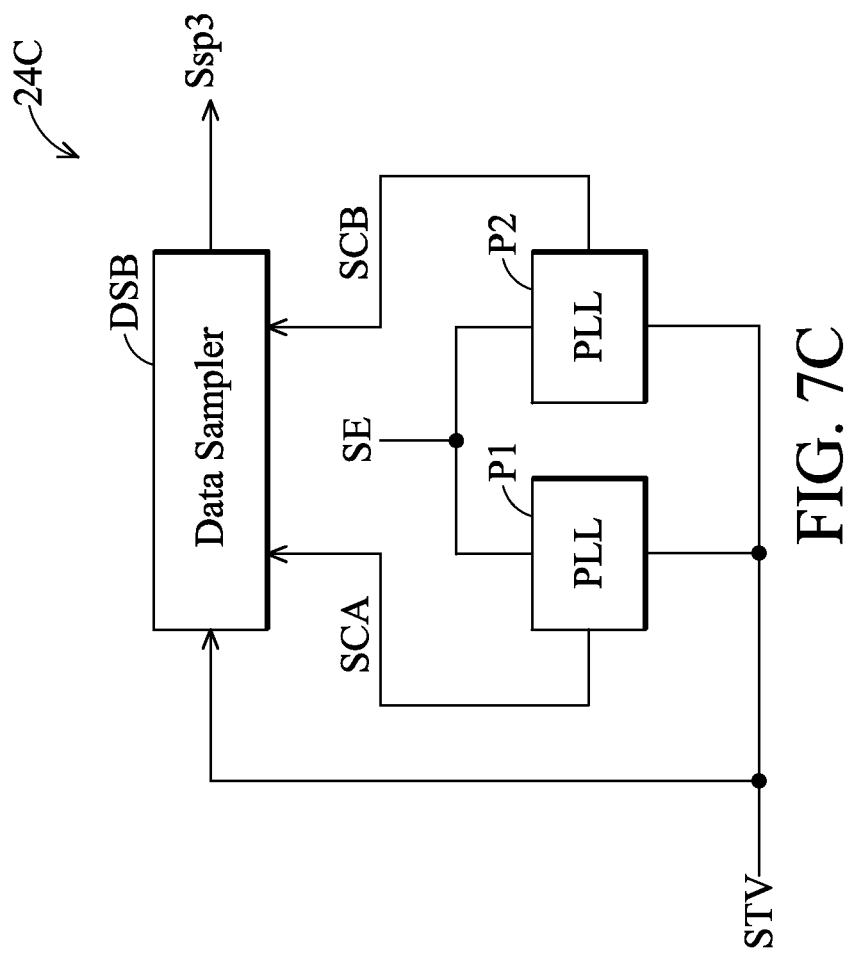
FIG. 7C shows another embodiment of a slicer.

FIG. 7C shows another embodiment of a slicer. As shown, a slicer 24C is similar to the slicer 24A shown in FIG. 7A, differing only in that the data sampler DSA is omitted and the data sampler DSA slices the television signal STV according to the sampling clocks SCA and SCB with different frequency but different phases and the threshold level STH to generate a bitstream Sps3 for the data check unit 23. Then, the serial to parallel converter 26 receives the bitstream Sps3 from slicer 24C, divides the bitstream Sps3 into two bitstreams, odd-numbered ($1^{st}$, $3^{rd}$, $5^{th}$, . . . ) and even-numbered ($2^{nd}$, $4^{th}$, $6^{th}$, . . . ) and converts the two bitstreams into the bitstreams Spp1 and Spp2. The data check and correction module 28 evaluates whether the bitstreams Spp1 and Spp2 are erroneous and outputs one according to the evaluated result to serve as the output data Dout.

FIG. 7D shows another embodiment of a slicer. As shown, a slicer 24D is similar to the slicer 24A shown in FIG. 7A, differing only in that the phase lock loop circuit P1 is omitted and the sampling clock SCA is generated by a delay circuit DL2 according to the sampling clock SCB from the phase lock loop circuit P2.

FIG. 7E shows another embodiment of a slicer. As shown, a slicer 24E is similar to the slicer 14 shown in FIG. 3, differing only in that the phase lock loop circuit P3 phase-locks the reference clock in the television signal STV during the clock-run-in interval to generate a sampling clock SC3 with a frequency N times that of the reference clock, in which N is an integer $\geq 2$. The data sampler DSB then slices the television signal STV to obtain a bitstream Sps4 according to the sampling clock SC3 and the threshold level STH. The serial to parallel converter 26 receives and converts the serially received bitstream Sps4 from the data sampler DSB into N bitstreams and the data check and correction module 28 evaluates whether the N bitstreams are erroneous and outputs one according to the evaluated result to serve as the output data Dout.

Because data decoding device can slice the television signal to obtain least two bitstreams representing teletext (or closed captions) at least two bitstreams according to different sampling points (time points), it can prevent data error because of incorrect sampling points caused by serious interference.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data decoding device receiving an analog signal carrying a reference clock and at least one digital data, comprising:
    a slicer slicing the analog signal at different sampling points by first and second sampling clocks to obtain first and second bitstreams, wherein the first and second sampling clocks have the same frequency and a predetermined phase difference; and
    a data check unit, evaluating whether the first bitstream is erroneous according to an error checking code thereof, outputting the first bitstream if it is error-free, and evaluating whether the second bitstream is erroneous according to the error checking code if the first bitstream is erroneous.

2. The data decoding device as claimed in claim 1, wherein the data check unit outputs the second bitstream if it is error-free, and otherwise outputs the first bitstream.

3. The data decoding device as claimed in claim 1, wherein the slicer phase-locks with the reference clock and generates the first and second sampling clocks accordingly.

4. The data decoding device as claimed in claim 1, wherein the error checking code is parity check code.

5. The data decoding device as claimed in claim 1, wherein the error checking code is Hamming code.

6. The data decoding device as claimed in claim 1, further comprising:
    a separator receiving the analog signal to generate horizontal synchronization and vertical synchronization signals; and
    a counter coupled to the separator, enabling the slicer to sample the analog signal according to the horizontal synchronization and vertical synchronization signals.

7. The data decoding device as claimed in claim 1, wherein the analog signal comprises a television signal.

8. The data decoding device as claimed in claim 1, wherein the digital data comprises close caption or teletexts.

9. The data decoding device as claimed in claim 1, wherein the slicer comprises:
    two phase lock loop circuits generating the first and second sampling clocks according to the reference clock in the analog signal; and
    at least one sampler sampling the analog signal at the different sampling point according to the first and second sampling clocks.

10. The data decoding device as claimed in claim 1, wherein the slicer comprises:
    a phase lock loop circuit generating the first sampling clock according to the reference clock in the analog signal;
    a delay circuit delaying the first sampling clock to serve as the second sampling clock; and
    at least one sampler sampling the analog signal at the different sampling point according to the first and second sampling clocks.

* * * * *